United States Patent [19]

Coker, Jr. et al.

[11] 3,914,789

[45] Oct. 21, 1975

[54] MANUALLY OPERATED MAGNETIC CARD ENCODER

[75] Inventors: Charles Walter Coker, Jr.; Thomas A. Hickox; John Joseph Lynott, all of Los Gatos; Thomas Frank O'Rourke, San Jose, all of Calif.

[73] Assignee: International Business Machines Corporation, Armonk, N.Y.

[22] Filed: Nov. 19, 1973

[21] Appl. No.: 416,910

[52] U.S. Cl. ............... 360/2; 235/61.11 D; 360/88; 360/51

[51] Int. Cl.$^{2}$ ................... G06K 7/016; G11B 15/18

[58] Field of Search ............... 360/69, 88, 61, 2, 70, 360/51; 235/61.11 D

[56] References Cited

UNITED STATES PATENTS

| | | | |
|---|---|---|---|
| 3,332,084 | 7/1967 | Wahrer | 360/69 |
| 3,636,313 | 1/1972 | Markowitz | 235/61.11 D |
| 3,685,836 | 8/1972 | Chernowitz | 360/2 |
| 3,708,790 | 1/1973 | Nourigat | 346/74 MP |
| 3,796,861 | 3/1974 | Hirata | 235/61.11 D |
| 3,803,350 | 4/1974 | Lemelson | 235/61.11 D |

*Primary Examiner*—Bernard Konick
*Assistant Examiner*—Jay P. Lucas
*Attorney, Agent, or Firm*—Shelley M. Beckstrand

[57] ABSTRACT

Apparatus for recording information on a manually actuated card wherein the recording of data on a designated portion of the card is synchronized with the card movement by timing signal generation equipment which moves in relationship to the card and provides the recording control pulses.

6 Claims, 4 Drawing Figures

MANUALLY OPERATED MAGNETIC CARD ENCODER

BACKGROUND OF THE INVENTION

1. Field of the Invention

This invention relates to magnetic recording synchronized systems and, more particularly, to a synchronized recording system for a manually driven data card.

2. Description of the Prior Art

In the prior art, there are various incrementing tape transport and magnetic data recording systems which have been disclosed. Generally, the tape transport apparatus includes electromechanical drive means responsive to control signals for incrementally moving a document past a write head.

For example, U.S. Pat. No. 3,275,208 discloses an incremental tape drive system including a motor that continuously drives the input of a suitable electrically operated clutch. The clutch, when energized, drives a capstan by means of a shaft, that in turn, drives a magnetic storage tape. A photoelectric tone wheel is also mounted on the shaft. In operation, the tape is driven past a set of transducing heads which record the character on the tape or read out the character from the tape each time the tape is moved through one incremental step.

U.S. Pat. No. 3,412,385 discloses a digital, magnetic recorder provided with a capstan clock for controlling the recording of digital information. The capstan is controlled by a motor.

An IBM Technical Disclosure Bulletin article entitled "Photoemitter for Recording Information," Vol. 9 No. 10, March 1967, page 1374 discloses photoemitter controls for recording of information on magnetic tape. The record medium is driven from a shaft associated with the timing disk.

U.S. Pat. No. 3,416,336 discloses an incremental magnetic tape transport wherein information is recorded while the tape is moving. The position of the recording is synchronized with the tape movement by means of a tone wheel which moves in synchronism with the tape and produces output pulses in response to which the information is recorded. Again, the apparatus includes motor drive means.

U.S. Pat. No. 3,465,349 discloses a high speed incremental tape transport having a magnetically detented incremental motor which rotates its output shaft under command signals. A control signal is generated by a photoelectric device at the midpoint of each incremental step to record each character while the tape is moving and in accurate spaced relation to the preceding character.

SUMMARY OF THE INVENTION

The manual drive transducing control system of the present invention greatly reduces the complexity of mechanics normally required to encode and record constant density data on a record medium. It enables a relatively low cost data encoder apparatus which heretofore has been uneconomical to produce. The apparatus has particular usefulness in the recording of data on credit card type documents.

Briefly, the manual drive transducing control system apparatus is arranged to record data characters at constant density on a record card having a magnetic record strip as the record card is moved through a slot by hand, at a velocity which may vary considerably because of human factors. The apparatus includeds a rotatable shaft which has a friction roll attached at one end that protrudes into the card slot. A recording transducer is arranged on the other side of the slot and spring-biased against the friction roll. The spring-biased transducer urges a record card passing in the slot against the friction roll causing the shaft to rotate with a peripheral velocity equal to the card velocity. Attached to the shaft is a disk with timing marks located about the circumference of the disk. Control signals are generated by a photoelectric system responsive to the position of the timing disk. The photoelectric system comprises a light source and photoelectric detector with the timing disk positioned therebetween to interrupt the light beam and control the energization of the photoelectric detector. The control signals are amplified and function to enable the data register to pass data representing signals to the record head for writing character information on the magnetic record strip of the record card.

It is a primary object of the present invention to provide an improved manually manipulated record driven data transducing system.

It is an object of the present invention to provide an improved control system for data recording on a document wherein the bit densities of the recorded data are independent of the document speed variations during recording.

Another object of the present invention is to provide appparatus capable of generating timing control signals in response to the manual advance of the documents upon which data is to be recorded.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Figure 1:
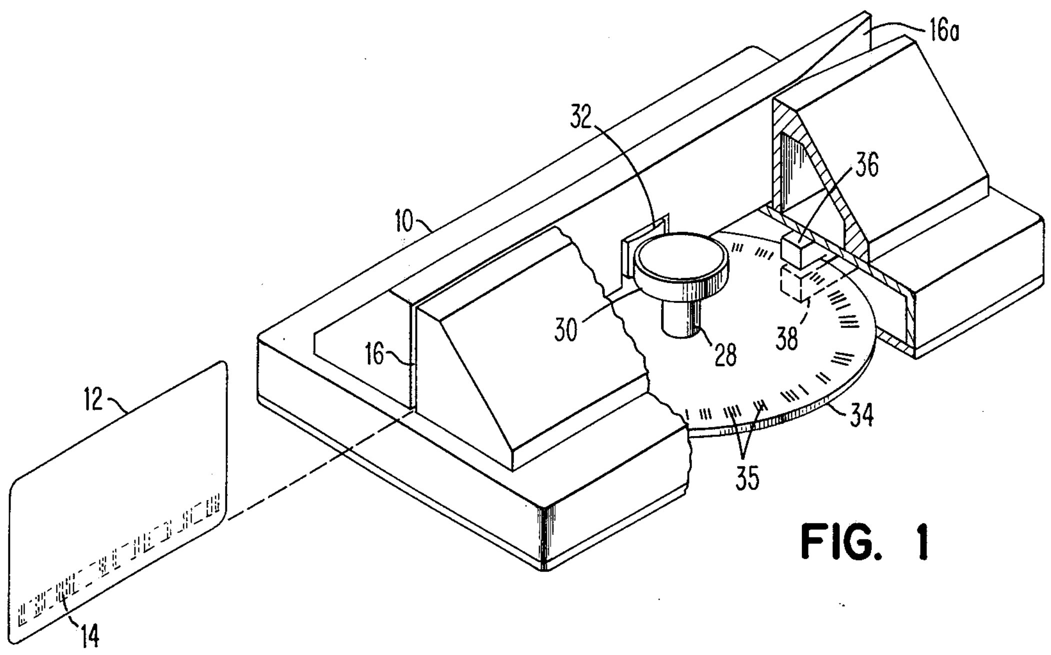
FIG. 1 is an isometric showing of a manually driven transducing apparatus in accordance with a preferred embodiment of the invention.
Figure 2:
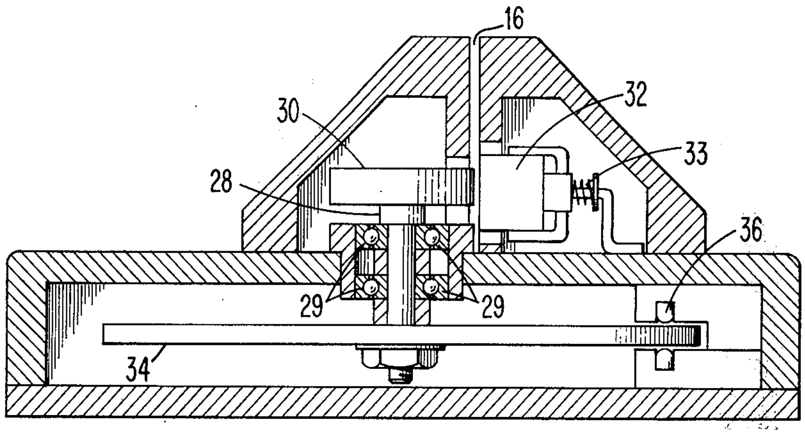
FIG. 2 is an elevational view of the manually driven transducing apparatus.
Figure 3:
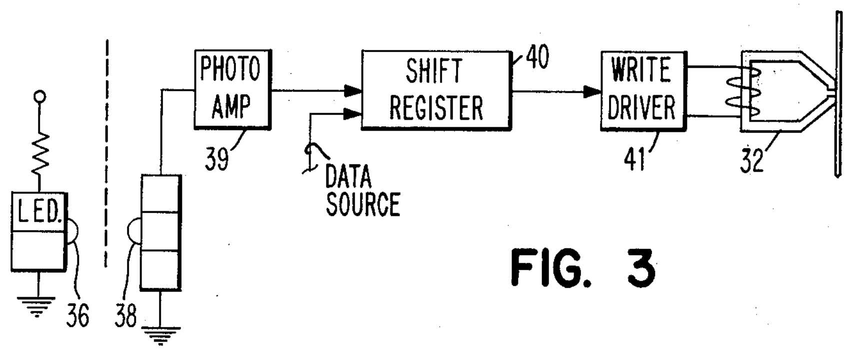
FIG. 3 is a schematic logic diagram of the circuitry associated with the manually driven transducing apparatus.
Figure 4:
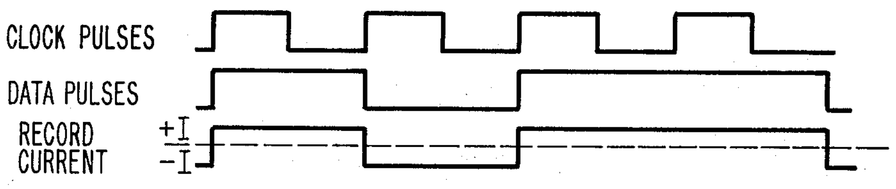
FIG. 4 is a timing diagram for the operation of the appparatus.

Referring now to the drawings, the data recording apparatus 10 construction in accordance with the invention is arranged to record character data at constant density on a card 12 along a magnetic record strip 14 as the card 12 is moved through a slot 16 by hand, at a velocity which may vary considerably because of human factors. The slot 16 is flared at the portion 16a to facilitate the insertion of the card 12 into the slot 16. The apparatus includes a timing capstan comprising a shaft 28 adapted to rotate freely in the support bearings 29. A friction roll 30 is arranged at one end of the shaft 28 and at one side of the slot 16 and protruding slightly into the slot 16. A recording transducer 32 is arranged on the other side of the slot 16 and biased by the spring 33 so as to bear against the roll 30. The spring biased transducer 32 urges the card 12 to frictionally engage the roll 30 as the card 12 is manually moved through the slot 16. The card 12 movement causes the roll 30 to rotate with a peripheral velocity equal to the velocity of the card 12.

Attached to the shaft 28 is a timing disk 34 having uniformly spaced timing marks 35 in the form of apertures located around the circumference of the timing disk 34. The timing disk 34 rotates with its timing marks 35 passing between the light source 36, which is a light-emitting diode, on one side of the timing disk 34 and a phototransistor 38 on the other side of the timing disk 34. The light-emitting diode 36 and the phototransistor 38 are arranged in housings. As the timing disk 34 rotates, the phototransistor 38 is turned "on" by the light emitted from the light source 36 and passing through the timing apertures 35 in the timing disk 34.

The signal output from the phototransistor 38 is passed through the amplifier 39. The amplifier 39 outputs are timing pulses which are applied to the data register 40. The data pulse outputs from the data register 40 are coupled to the write driver 41 and then to the recording transducer 32 for recording on the magnetic strip 14 along the card 12. The clocking pulses are generated by the apertures 35 on the timing disk 34 and occur at a rate which is proportional to the speed or movement of the card 12 through the slot 16 and thereby function to control the recording densities of the character bits along the magnetic strip 14.

By logically subdividing the basic timing disk 34 by some integer number N greater than 1, it is possible to record at a lower density, as for example, at a density of ½, ⅓, ¼. . . or 1/N of the highest density. The divided clock can then be used to clock record data from the data register 40 to the transducer or write head 32.

The starting position for recording data on the strip 14 is determined by logically counting a fixed number of timing pulses. Therefore, data always starts at the same position from the leading edge of the strip 14, without use of a second means of sensing card position, such as with a microswitch or phototransistor and light source.

The friction roll 30 and the timing disk 34 assembly are designed as a low-inertia system to prevent tolerances between the card 12 and friction roll 30. The recording head mount is gimbaled in order to maintain contact between the slot 16 in a vertical position. The use of a spring-biased recording head 32 permits encoding on document cards 12 having different thicknesses, as for example, in the range of 5 to 35 mils.

Alternatively, a magnetic read head can be added and precede the record head to read data from the strip 14 before a recording operation. Similarly, a magnetic read head can also be utilized following the record head to verify the encoded and recorded data. A print head can also easily be arranged in the apparatus to print visibly readable data on the card 12.

While the invention has been particularly shown and described with reference to the preferred embodiments thereof, it will be understood by those skilled in the art that various changes in the form and details may be made therein without departing from the spirit and scope of the invention.

What is claimed is:

1. Apparatus for magnetically recording binary data from a register at a constant density on a magnetizable surface of a record member, said apparatus comprising:

housing means defining a slot into and through which the member is linearly manually advanced at a non-constant acceleration during a series of recording operations, a capstan disposed at one side of the slot and frictionally rotatablty driven by the member at a variable speed directly proportional to the instantaneous lineal speed of the member, pulse generator means including a disk coaxially connected to the capstan for rotation thereby and means cooperative with said disk for supplying clocking signals to said register at a frequency which varies according to the rotational speed of the capstan, and a transducer disposed within said slot and connected to the register to effect recording of data from the register onto the surface in response to said clocking signals, whereby binary data will be recorded on the member at constant density irrespective of variations in the speed at which the member is linearly advanced.

2. Apparatus according to claim 1 wherein said transducer is disposed at the other side of said slot from said capstan, and further, including means for resiliently biasing said transducer toward said capstan to assure intimate contact of said transducer with the member during recording.

3. Apparatus according to claim 1, wherein said disk comprises a plurality of uniformly spaced circumferentially disposed apertures and the cooperative means comprises a light source and photocell displaced circumferentially from the bite of the capstan and transducer.

4. Apparatus according to claim 2, wherein the circumferential spacing of the apertures is preselected to correspond to the density desired for the data on the record member.

5. Apparatus according to claim 1, wherein the record member is a card having the magnetizable surface adjacent one edge thereof, and said slot is of lessor depth than the width of the card as measured from said one edge, thereby to enable the card to be continuously gripped for manual advancement along the slot and past the transducer.

6. Apparatus for recording serially and at a constant density along a linear recording path binary data stored in a register onto a succession of members, each having a magnetizable surface, each said member adapted to be moved manually successively relative to a magnetic transducer at a rate which varies from member to member and during the recording operation on each member, comprising in combination:

housing means defining a slot into and through which each said member is successively linearly advanced along a path, said housing means being arranged to position a portion of said member outside of said slot to allow movement of the member by hand throughout the extent of said path, and the remaining portion within said slot;

a capstan disposed at one side of said slot and frictionally rotatably driven by said remaining portion of said member, as said member is manually moved along said path, at a variable speed directly proportional to the instantaneous lineal speed of the member;

pulse generation means including a disk coaxially connected to the capstan for rotation thereby as the member is moved along said path;

means cooperative with said disk for supplying clocking signals to said register at a frequency which varies at a rate in direct proportion to the rotational speed of the capstan;

means disposed in said housing for loading said transducer into contact with said member so as to frictionally engage the magnetizable surface of said remaining portion of said member;

said transducer being responsive to said clocking signals to effect recording of data from the register onto the surface;

whereby the pulse generator disk is rotated by a capstan which is not required to drive said member through said path against transducer loading and other retarding forces which may cause slippage, such that binary data will be recorded on the member at constant density irrespective of variations in the speed at which the member is manually linearly advanced.

* * * * *